(12) United States Patent
Troisi et al.

(10) Patent No.: US 11,500,463 B2
(45) Date of Patent: Nov. 15, 2022

(54) WEARABLE ELECTROENCEPHALOGRAPHY SENSOR AND DEVICE CONTROL METHODS USING SAME

(71) Applicant: Imagine Technologies, Inc., Florham Park, NJ (US)

(72) Inventors: Ian Davies Troisi, Davenport, FL (US); Justin Henry Deegan, Davenport, FL (US); Connor Liam McFadden, Davenport, FL (US); Nicholas Albert Silenzi, Davenport, FL (US)

(73) Assignee: Imagine Technologies, Inc., Florham Park, NJ (US)

( * ) Notice: Subject to any disclaimer, the term of this patent is extended or adjusted under 35 U.S.C. 154(b) by 0 days.

(21) Appl. No.: 17/520,255

(22) Filed: Nov. 5, 2021

(65) Prior Publication Data
US 2022/0206576 A1 Jun. 30, 2022

Related U.S. Application Data

(60) Provisional application No. 63/132,001, filed on Dec. 30, 2020.

(51) Int. Cl.
*G06F 3/01* (2006.01)
*G06F 3/0346* (2013.01)
(Continued)

(52) U.S. Cl.
CPC .............. *G06F 3/015* (2013.01); *G06F 1/163* (2013.01); *G06F 3/0346* (2013.01);
(Continued)

(58) Field of Classification Search
CPC ........ G06F 3/015; G06F 3/0346; G06F 1/163; G06F 3/0482; G06F 3/04842;
(Continued)

(56) References Cited

U.S. PATENT DOCUMENTS 9,503,772 B2 11/2016 Azam
10,044,712 B2 * 8/2018 Gordon .............. G02B 27/0172
(Continued)

FOREIGN PATENT DOCUMENTS

TW     201238562 A    10/2012
WO    2020186385 A1    9/2020

OTHER PUBLICATIONS

Ashraf, I. et al., Application of Deep Covolutional Neural Networks and Smartphone Sensors for Indoor Localization, Applied Sciences, 2019, vol. 9, 2337.

(Continued)

*Primary Examiner* — Grant Sitta
(74) *Attorney, Agent, or Firm* — Fox Rothschild LLP

(57) ABSTRACT

Disclosed herein are systems and methods for controlling electronic devices based on detected brain activity. For example, a system includes a wearable over-the-ear electronic device has a set of dry EEG sensors, a camera, a processor, and programming instructions. The programming instructions cause the processor to receive images from the camera, process the images to identify features corresponding to a known device, and receive brain-wave signals from the EEG sensors. The system compares the brain-wave signals to measure a level of brain activity. Upon detection of both (a) a feature corresponding to the known device and (b) a level of brain activity that deviates from a baseline by at least a threshold level, the system generates a command signal configured to cause the known device to actuate and transmits the command signal to a controller for the known device.

27 Claims, 12 Drawing Sheets

(51) Int. Cl.
*G06V 10/75* (2022.01)
*G06V 20/10* (2022.01)
*G06T 7/73* (2017.01)
*G06N 20/00* (2019.01)
*G06V 10/25* (2022.01)
*G06F 1/16* (2006.01)
*G06F 3/0482* (2013.01)
*G06F 3/04842* (2022.01)

(52) U.S. Cl.
CPC ........ *G06F 3/0482* (2013.01); *G06F 3/04842* (2013.01); *G06N 20/00* (2019.01); *G06T 7/73* (2017.01); *G06V 10/25* (2022.01); *G06V 10/751* (2022.01); *G06V 20/10* (2022.01)

(58) Field of Classification Search
CPC ...... G06V 10/751; G06V 20/10; G06V 10/25; G06N 20/00; G06T 7/73
See application file for complete search history.

(56) References Cited

U.S. PATENT DOCUMENTS

| | | | |
|---|---|---|---|
| 10,289,205 B1* | 5/2019 | Sumter | G06F 3/0346 |
| 10,372,988 B2 | 8/2019 | Wexler et al. | |
| 10,520,378 B1 | 12/2019 | Brown | |
| 10,558,272 B2 | 2/2020 | Parshionikar | |
| 10,656,711 B2 | 5/2020 | Kaifosh et al. | |
| 2012/0029379 A1* | 2/2012 | Sivadas | A61B 5/7282 600/545 |
| 2013/0317382 A1* | 11/2013 | Le | A61B 5/375 600/547 |
| 2014/0168081 A1* | 6/2014 | Kerr | G09G 5/373 345/158 |
| 2014/0250397 A1* | 9/2014 | Kannan | G06F 1/1686 715/771 |
| 2014/0307106 A1* | 10/2014 | Hughes | H04N 21/4222 348/191 |
| 2014/0333529 A1* | 11/2014 | Kim | G06F 3/015 345/156 |
| 2015/0313496 A1 | 11/2015 | Connor | |
| 2016/0104451 A1* | 4/2016 | Sahin | G09G 3/002 345/519 |
| 2016/0360970 A1 | 12/2016 | Tzvieli et al. | |
| 2017/0103440 A1* | 4/2017 | Xing | H04W 12/06 |
| 2017/0171441 A1* | 6/2017 | Kearns | A61B 5/316 |
| 2017/0188947 A1* | 7/2017 | Connor | A61B 5/369 |
| 2017/0259167 A1 | 9/2017 | Cook et al. | |
| 2018/0165951 A1* | 6/2018 | Kim | G06F 3/167 |
| 2018/0239430 A1* | 8/2018 | Tadi | A61B 5/0036 |
| 2018/0314416 A1 | 11/2018 | Powderly | |
| 2019/0038166 A1* | 2/2019 | Tavabi | G06F 3/015 |
| 2019/0054371 A1 | 2/2019 | Hamilton et al. | |
| 2019/0094981 A1* | 3/2019 | Bradski | G06F 3/017 |
| 2019/0101977 A1* | 4/2019 | Armstrong-Muntner | G06N 20/00 |
| 2019/0175000 A1* | 6/2019 | Peleg | A61B 1/00009 |
| 2019/0294243 A1* | 9/2019 | Laszlo | A63F 13/67 |
| 2019/0294244 A1* | 9/2019 | Ramer | A61B 5/24 |
| 2020/0057499 A1* | 2/2020 | Zhang | A61B 5/378 |
| 2020/0126548 A1 | 4/2020 | Kim | |
| 2020/0245938 A1* | 8/2020 | Xu | A61B 5/7264 |
| 2020/0337653 A1* | 10/2020 | Alcaide | A61B 5/163 |
| 2021/0174079 A1 | 6/2021 | Wang | |
| 2021/0264679 A1 | 8/2021 | Liu | |
| 2021/0279863 A1 | 9/2021 | Jacenkow | |
| 2021/0326646 A1 | 10/2021 | Gultekin | |
| 2022/0000409 A1* | 1/2022 | Chiang | A61B 5/369 |
| 2022/0016423 A1* | 1/2022 | Vysokov | A61N 1/0476 |
| 2022/0155867 A1* | 5/2022 | Connor | G06F 3/041 |

OTHER PUBLICATIONS

Liao et al., Gaming control using a wearable and wireless EEG-based brain-computer interface device with novel dry foam-based sensors, BioMed Central, Journal of NeuroEngineering and Rehabilitation 2012, 9:5.
Kappel, S. et al., Dry-Contact Electrode Ear-EEG, IEEE Trans Biomed Eng., 2019, 66(1): 150-158.
Introducing the World's Smallest EEG Wearable, printed Nov. 1, 2021, available at www.nurio.info.
Galea: Biosensing + Spatial Computing, Welcome to the OpenBCI Community, printed Nov. 1, 2021, available at www.openbci.com.
The New MYNDBAND EEG Brainwave Headset, printed Nov. 1, 2021, available at www.myndplay.com.
How It Works, printed Nov. 5, 2021, available at www.next-mind.com/technology.

* cited by examiner

WEARABLE ELECTROENCEPHALOGRAPHY SENSOR AND DEVICE CONTROL METHODS USING SAME

CROSS-REFERENCE TO RELATED APPLICATIONS

This application claims priority under 35 U.S.C. § 119(e) to U.S. Provisional Application No. 63/132,001, filed Dec. 30, 2020, the disclosure of which is incorporated herein by reference in its entirety.

BACKGROUND

Electroencephalography is an electrophysiological monitoring method to non-invasively record electrical activity on a human's scalp that has been shown to represent the macroscopic activity of the surface layer of the brain underneath. A brain-computer interface (BCI) is a communication system that can help users interact with the outside environment by translating brain signals into machine commands. The use of electroencephalographic (EEG) signals has become the most common approach for a BCI because of their usability and reliability. However, existing BCIs tend to be uncomfortable, unsightly, and/or unwieldy to wear during normal daily activity.

This document describes methods and systems that address issues such as those discussed above, and/or other issues.

SUMMARY

The present disclosure describes embodiments related to a wearable electroencephalography sensor and associated device control methods and methods of developing a database of controllable objects in an environment. In an embodiment, a system for detecting brain waves of a person is disclosed. The system includes a housing configured to fit over an ear of the person. The housing includes a bridge over the ear, a first portion extending forward from the bridge to a position over a temple of the person, and a second portion extending rearward from the bridge. The system further includes a first dry electroencephalography (EEG) sensor disposed in the second portion, a second dry EEG sensor disposed in the first portion, a power supply, a processor, a camera in communication with the processor, and a transmitter in communication with the processor.

Implementations of the disclosure may include one or more of the following optional features. In some implementations, the camera is disposed in the first portion and configured to capture images of objects in a field of view of the person when wearing the housing over the ear. In some implementations, the system includes a flexible earpiece extending downward from the housing and positioned to fit under a lobe of the ear when worn by the person and a third dry EEG sensor disposed in the flexible earpiece. The system may further include a position sensor or an orientation sensor disposed in the housing. In some examples, the system includes memory disposed in the housing. The memory may hold a data store containing data representing features associated with known devices, the features extracted from captured images of the known devices.

In an embodiment, a method of controlling one or more objects in an environment is disclosed. The method includes, by a processor of an electronic device, receiving images from a camera of the electronic device, the electronic device having EEG sensors, and processing the images to identify features corresponding to a known device. The method includes receiving brain-wave signals from at least two of the EEG sensors and comparing the brain-wave signals to measure a level of brain activity. Upon detection of both (a) a feature corresponding to the known device and (b) the level of brain activity deviating from a baseline by at least a threshold level, the method includes generating a command signal configured to cause the known device to actuate and transmitting the command signal to the known device (or a controller for the known device).

Implementations of the disclosure may include one or more of the following optional features. In some implementations, processing the images to identify features corresponding to the known device includes: extracting one or more image features from the images and comparing the image features with one or more known features corresponding to the known device, where the known features were extracted from previously captured images of the known device. Comparing the image features with one or more known features may include determining that at least a threshold number of image features correspond with known features. The feature may include a symbol or pattern of symbols imprinted on a surface of the known device. The method may further include receiving the images at a rate of at least two times per second.

In some examples, the electronic device includes an inertial measurement unit (IMU) and the method further includes, in response to determining that the known device has an adjustable setpoint, using the IMU to adjust the setpoint. In some examples, the electronic device includes an inertial measurement unit (IMU) and the method further includes, in response to determining that the known device is an electronic user interface, using the IMU to select a location on the electronic user interface at which the actuation will occur.

In an embodiment, a system for controlling one or more objects in an environment is disclosed. The system includes a wearable over-the-ear electronic device having a set of dry EEG sensors, a camera, a processor, and programming instructions. The programming instructions are configured to cause the processor to receive images from the camera, process the images to identify features corresponding to a known device, and receive brain-wave signals from at least two of the EEG sensors. The system compares the brain-wave signals to measure a level of brain activity. Upon detection of both (a) a feature corresponding to the known device and (b) the level of brain activity deviating from a baseline by at least a threshold level, the system generates a command signal configured to cause the known device to actuate and transmits the command signal to the known device (or a controller for the known device).

Implementations of the disclosure may include one or more of the following optional features. The brain-wave signals may include beta wave signals. The feature corresponding to the known device may include a shape of a surface of the known device. The feature may include a symbol or pattern of symbols imprinted on a surface of the known device. In some examples, the system further includes an inertial measurement unit (IMU) and additional programming instructions that are configured to cause the processor to, in response to determining that the known device has an adjustable setpoint, uses the IMU to adjust the setpoint. In some examples, the system further includes an inertial measurement unit (IMU) and additional programming instructions that are configured to cause the processor to, in response to determining that the known device is an electronic user interface, uses the IMU to select a location on the electronic user interface at which the actuation will occur.

The wearable over-the-ear electronic device may further include a housing configured to fit over an ear of a person, the housing including a bridge over the ear, a first portion extending forward from the bridge to a position over a temple of the person, and a second portion extending rearward from the bridge. The wearable over-the-ear electronic device may further include a first dry electroencephalography (EEG) sensor disposed in the second portion, a second dry EEG sensor disposed in the first portion, a power supply, and a transmitter in communication with the processor.

The wearable over-the-ear electronic device may further include a data store containing known features corresponding to the known device, where the known features were extracted from previously captured images of the known device. The programming instructions may include instructions to extract one or more image features from the received images and compare the image features with the known features to identify the known device. The instructions to compare the image features with the known features may include instructions to determine that a threshold number of image features correspond with known features.

In an embodiment, a method of developing a database of objects in an environment is disclosed. The method includes using a mobile device having a camera to capture images of objects in the environment. For each object, the method includes receiving, via a user interface, a user selection of the object and, in response to receiving the user selection, creating a pattern of recognizable features of the object. The pattern of recognizable features is created by identifying features related to the object in one or more of the images and transmitting the features to a wearable electronic device via a communication link between the mobile device and the wearable electronic device, causing the wearable electronic device to save the pattern to a data store in the wearable electronic device.

Implementations of the disclosure may include one or more of the following optional features. In some examples, the method further includes receiving an executable command associated with the selected object and transmitting the executable command to the wearable electronic device via the communication link, which causes the wearable electronic device to associate the executable command with the pattern. The executable command, when executed by the wearable electronic device, may cause the wearable electronic device to adjust a setting of the object. Identifying the features may include locating one or more keypoints in the one or more images and assigning identifiers to the keypoints. The identifiers may include Binary Robust Independent Elementary Features (BRIEF) descriptors. Receiving the user selection of the object may include receiving a user selection of an image of the object.

In an embodiment, a method of training a machine-learning model is disclosed. The method includes using a mobile device having a camera to capture images of objects in an environment. For each object, the method includes receiving, via a user interface, a user selection of the object, receiving a command associated with the selected object and, in response to receiving the user selection, training the machine-learning model to recognize the object. The method trains the machine-learning model to recognize the object by receiving a plurality of images of the object and training the machine-learning model based on the plurality of images. The method further includes transmitting the trained model and the command to a wearable electronic device via a communication link between the mobile device and the wearable electronic device, causing the wearable electronic device to save the trained machine-learning model to a data store in the wearable electronic device and to associate the command with the trained machine-learning model.

Implementations of the disclosure may include one or more of the following optional features. Causing the wearable electronic device to associate the command with the trained machine-learning model may further cause the wearable electronic device to execute the command in response to the trained machine-learning model recognizing the object in an image captured by the wearable electronic device. The command, when executed, may cause the object to change from a first state to a different state. The machine-learning model may include a neural network. Receiving the plurality of images may include capturing a video of the object at multiple angles. The machine-learning model may be configured to determine a probability that the object is in the image, and the machine-learning model may be further configured to recognize the object when the determined probability satisfies a probability threshold.

The method may further include determining one or more regions of interest of one or more of the plurality of images and training the machine-learning model based on the portion of the plurality of images within the one or more regions of interest. In some examples, the method includes receiving a reference image of the selected object and identifying reference features related to the selected object in the reference image. The method may further include constructing a bounding box around the object in one or more of the plurality of images, extracting features from the portion of each of the images within the bounding boxes, and comparing the extracted features with the reference features. In response to a threshold number of extracted features matching reference features, the method may include training the machine-learning model on the portion of the image within the bounding box. In some examples, the method includes adjusting a dimension, position, or orientation of the bounding box around the object until the threshold number of extracted features match reference features.

In an embodiment, a system for training a machine-learning model is disclosed. The system includes a mobile device having a camera to capture images of objects in an environment. The mobile device is configured to receive, via a user interface, a user selection of an object, receive a command associated with the selected object, and train the machine-learning model to recognize the object. The system trains the machine-learning model to recognize the object by receiving a plurality of images of the object, training the machine-learning model based on the plurality of images and transmitting the trained model and the command to a wearable electronic device via a communication link between the mobile device and the wearable electronic device, causing the wearable electronic device to save the trained machine-learning model to a data store in the wearable electronic device and to associate the command with the trained machine-learning model.

Implementations of the disclosure may include one or more of the following optional features. Receiving the plurality of images may include capturing a video of the object at multiple angles. The mobile device may be further configured to determine one or more regions of interest of one or more of the plurality of images and train the machine-learning model based on the portion of the plurality of images within the one or more regions of interest. In some examples, the mobile device is configured to receive a reference image of the selected object and identify reference features related to the selected object in the reference image. The mobile device may construct a bounding box around the object in one or more of the plurality of images, extract features from the portion of each of the images within the bounding boxes and compare the extracted features with the reference features. In response to a threshold number of extracted features matching reference features, the mobile device may train the machine-learning model on the portion of the image within the bounding box. The mobile device may be configured to adjust a dimension, position, or orientation of the bounding box around the object until the threshold number of extracted features match reference features.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun or phrase, such use is simply intended to distinguish one item from another and is not intended to require a sequential order unless specifically stated. The term "about" when used in connection with a numeric value, is intended to include values that are close to, but not exactly, the number. For example, in some embodiments, the term "about" may include values that are within +/−10 percent of the value.

Figure 1:
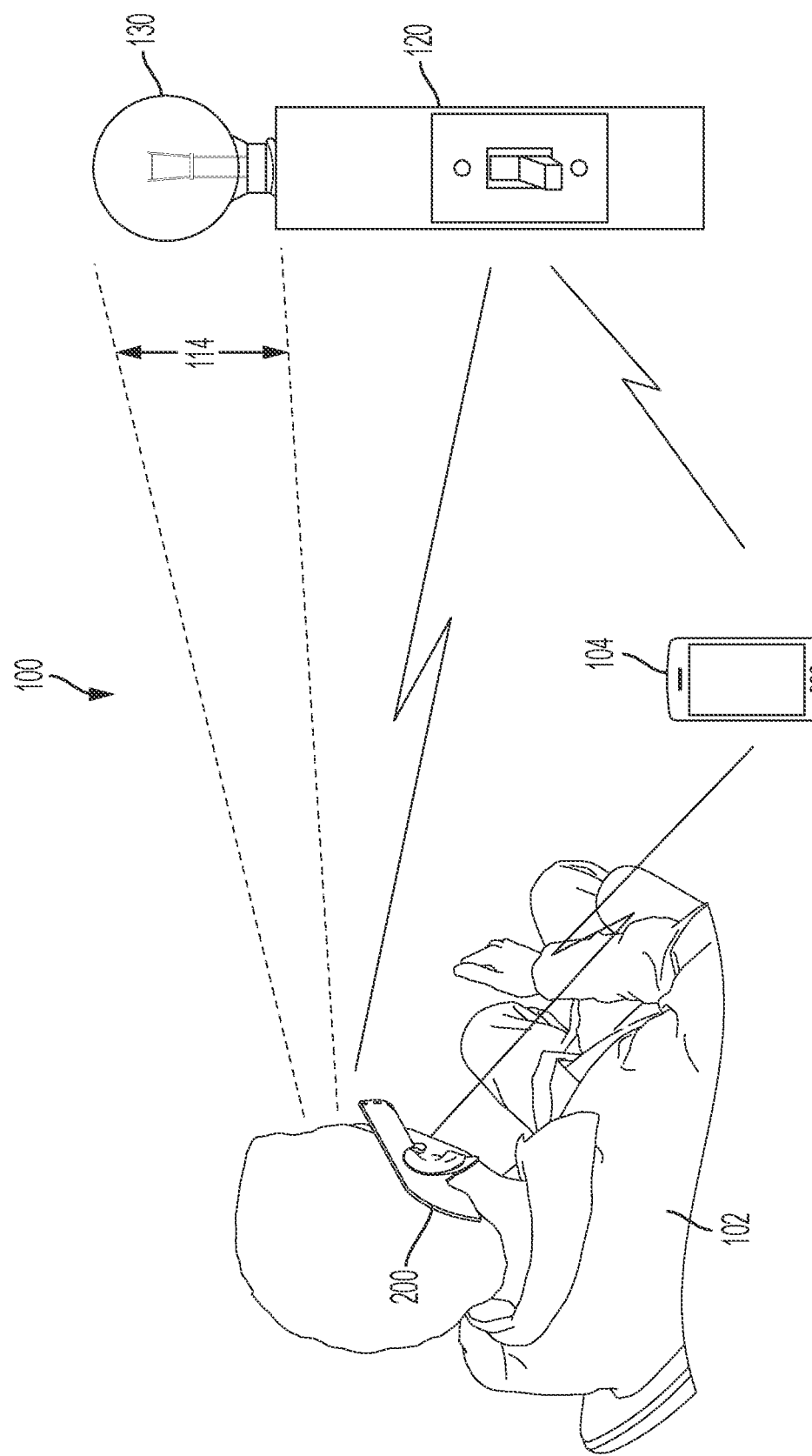
FIG. 1 shows an example environment for controlling a device based on brain activity.
Figure 2:
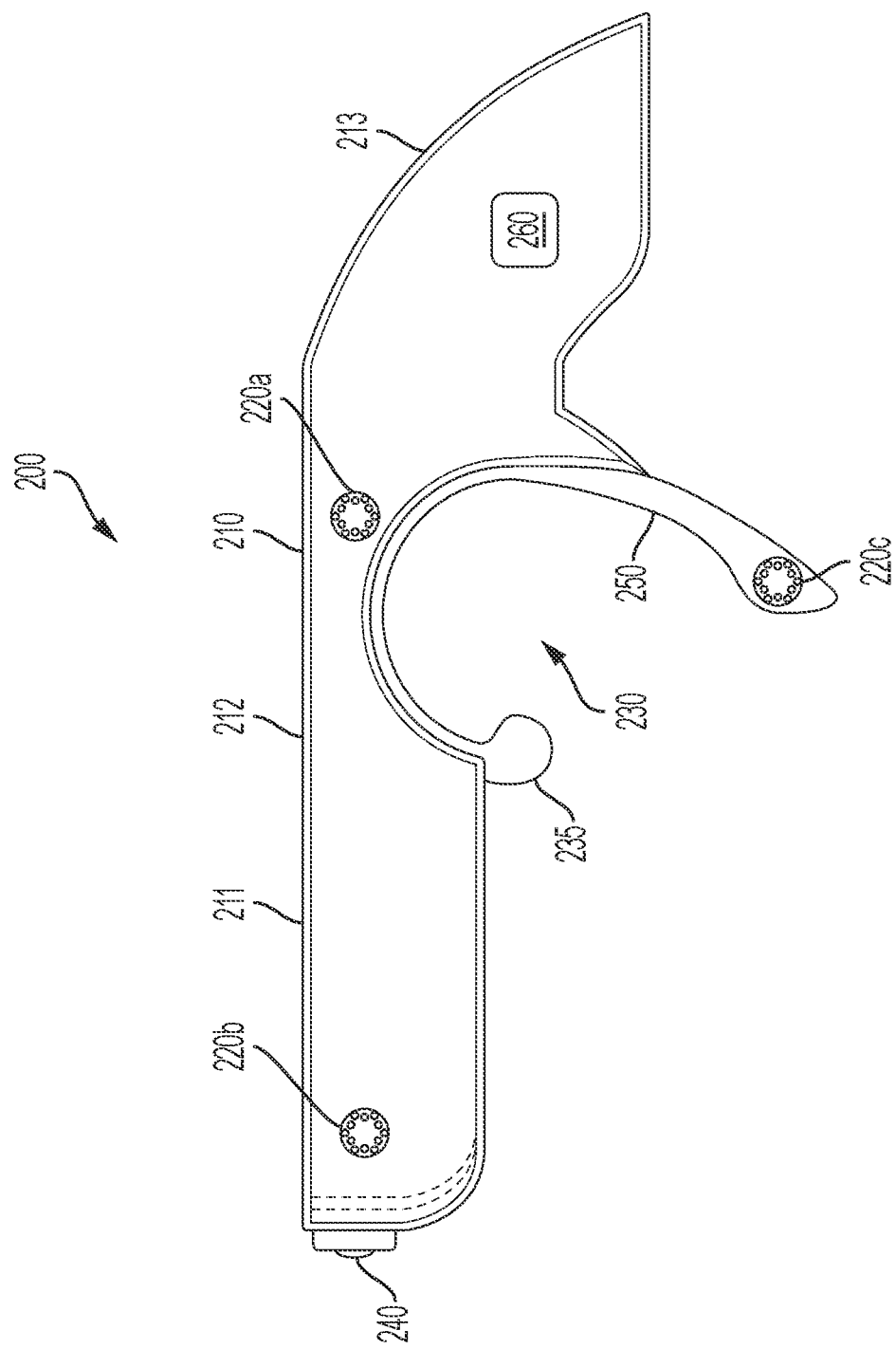
FIG. 2 shows an example wearable EEG apparatus.

The present disclosure relates generally to methods and systems for developing a database of controllable objects in an environment, detecting brain activity, and controlling one or more electrical or electronic devices based on the detected brain activity. FIG. 1 shows an example environment 100 for controlling a device 130 based on brain activity. The environment 100 includes a user 102 associated with a wearable EEG apparatus 200. Here, the wearable EEG apparatus 200 is affixed to an ear of the user 102 and is configured to monitor brain activity of the user 102 via one or more EEG sensors 220 (FIG. 2). The wearable EEG apparatus 200 is in wireless communication with a device controller 120 capable of controlling one or more functions or characteristics of a device 130. The wireless communication may follow communication protocols such as Near Field Communication (NFC), Bluetooth, WiFi, Infrared (IrDA), or other technology allowing for transmitting and/or receiving information wirelessly. The device controller 120 may be capable of receiving instructions and, in response to receiving the instructions, controlling, operating, or adjusting the device 130 according to the instructions. Here, the device controller 120 is capable of turning a light bulb on and off. In other examples, the device controller 120 may adjust a setpoint, such as the temperature setting of a climate control system, or the station and/or volume of a television or audio system. The device controller 120 may adjust more complex parameters, such as a time profile of a setting. The device controller 120 may also adjust a virtual setting, such as the position of a cursor or other object on a computer screen, or the remaining time on a countdown timer. The device controller 120 includes a switch, a transistor, or another device (such as a microprocessor or integrated circuit) that is capable of causing the device 130 to change a condition. For example, the device controller 120 may be capable of closing a circuit that includes the device 130 and a power source, and also opening the circuit between the device 130 and power source, thus turning the device on and off. The device controller 120 also may include a circuit that can adjust one or more functions of the device 130, such as a light brightness control, a volume control, a fan speed control, or other control device. Other examples of devices 130 that may be controlled by the device controller 120 include remote controlled doors, windows, skylights, blinds or shades, etc., kitchen appliances such as toasters, blenders, ovens, range tops, garbage disposals, trash compactors, plumbing devices such as sinks, showers, or toilets, Internet of Things (IoT) devices such as smart plugs, and any other device that can be controlled using a computer.

In some embodiments, the wearable EEG apparatus 200 is in wireless communication with a computing device 104 associated with the user 102. The computing device 104 may be capable of directly controlling one or more functions or characteristics of the device 130. The computing device 104 may transmit instructions to the device using a wired or wireless communication channel. For example, the computing device 104 may transmit an infrared or RF signal to control audio, video, or other electronic equipment, e.g., to cause the device to change its state. For example, if the device is a television, the command may be to actuate the television's power switch and thus from on to off) or vice versa, to or change to a different station. The computing device 104 may also send an audio signal to a voice-controlled device, such as a virtual assistant. Alternatively, the computing device 104 may be in communication with the device controller 120, allowing the computing device 104 to control one or more functions or characteristics of the device 130 via the device controller 120. For example, the computing device 104 may transmit a signal (such as an optical signal or a communication with instructions) to turn a smart outlet on or off or control a smart appliance, such as an oven, crockpot, clothes washer/dryer, refrigerator, garage door opener, dishwasher, vacuum cleaner, alarm system, climate control system, or the like. Examples of computing devices include smartphones, tablets, laptop computers, or other devices capable of wirelessly communicating with the wearable EEG apparatus 200 and directly or indirectly controlling one or more functions or characteristics of the device 130, e.g. by interfacing with the device controller 120.

The wearable EEG apparatus 200 also includes an imaging system 240 (FIG. 2), such as a camera, capable of receiving images of objects in the field of view 114 of the imaging system 240. The imaging system 240 may be configured to capture images of objects in the field of view of the user. Here, the light bulb is with the field of view 114 of the imaging system 240. The wearable EEG apparatus 200 may detect brain activity of the user 102 indicating that the user 102 is focusing on an object in the field of view of the user (e.g., the light bulb). In response to detecting the brain activity, the wearable EEG apparatus 200 may transmit a signal to the device controller 120, causing the device controller 120 to turn the light on. The signal may be a digital signal that transfers programming instructions and/or an encoded data packet that, when received by a processor of the device controller 120, will cause the processor to trigger the device controller 120 to take an action, such as turn the device 130 on or off. The signal also may be a timed sequence of pulses (such as those of a modulated infrared signal) that, when received by the device controller 120 and recognized by its processor, will cause the processor to activate or deactivate or change the state of the device 130.

FIG. 2 shows an example wearable EEG apparatus 200. The apparatus 200 includes a housing 210 supporting and/or containing other components of the apparatus 200. The housing 210 may be configured to be worn over the ear of a user 102. The housing 210 may be formed from a rigid or semi-rigid material, such as a plastic, and may be curved or otherwise shaped to conform with the side of the user's head. The housing 210 may be an elongated structure with a forward section 211, a central section 212 and a rear section 213. When the device is worn over a user's ear, forward section 211 will extend from the user's ear toward the user's face, and rear section 213 will extend from the user's ear toward the back of the user's head and/or neck. Central section 212 serves as a bridge over the user's ear by joining the forward section 211 and the rear section 213 and including a semicircular indentation 230 that is sized and positioned to be placed over the ear, behind (and optionally extending upward from) the helix of the ear. Optionally, the semicircular indentation 230 may include a liner 235 formed of a gel, an elastomer such as silicone or other elastic or rubber-like material, or other resilient material to provide a more comfortable fit, and also to help keep the device from falling off of the user's ear during use.

The housing 210 may include mounting positions for two or more EEG sensors and an imaging system 240. Here, three EEG sensors 220a, 220b, 220c that are dry EEG sensors are mounted on the housing 210. (This document may refer to the EEG sensors collectively using reference number 220.) Dry EEG sensors are capable of operating without the use of conductive gel or paste. However, EEG sensors that are wet EEG sensors are also within the scope of the disclosure. In some examples, wearable EEG apparatus 200 is configured to locate the three EEG sensors 220a, 220b, 220c near locations T4, F8, and A2, respectively, of International 10-20 system of describing the location of scalp electrodes.

As shown, a first EEG sensor 220a is mounted on the central section 212 of the housing 210 so that, when the wearable EEG apparatus 200 is worn by the user 102, the first EEG sensor 220a will contact the user 102 at a position behind the user's ear (i.e., a location under the ear's helix or between the helix and the back on the user's head), over a temporal lobe of the user's brain.

A second EEG sensor 220b is mounted on the forward section 211 of the housing 210 so that the second EEG sensor 220b will contact the user 102 at a position at or near the user's temple, over a frontal lobe of the user's brain.

A third EEG sensor 220c is mounted on the housing 210 so that the third EEG sensor 220c will contact the user 102 at a position that is relatively lower on the user's head than the positions of the first EEG sensor 220a and second EEG sensor 220b below the first EEG sensor 220a. For example, the position of the third EEG sensor 220c may correspond to a location that is under the user's earlobe when worn. In some examples, the third EEG sensor 220c is mounted on a flexible earpiece 250 extending away (e.g., downward) from either the central section 212 or the rear section 213 of the housing 210. The flexible earpiece 250 may be formed from a gel, an elastomer such as silicone or other elastic or rubber-like material, or other materials, and it may be integral with or separate from liner 235. The flexible earpiece 250 may including wiring leading from the electrical components within the housing 210 to the third EEG sensor 220c. In some examples, the wiring includes Benecreat aluminum wiring. The flexible earpiece 250 may be covered with a cloth and/or padding to provide additional comfort. The flexible earpiece 250 may bend to facilitate placing the wearable EEG apparatus 200 over an ear of the user 102 and securely attaching the wearable EEG apparatus 200 to the user 102. In some examples, the flexible earpiece 250 is capable of securing the wearable EEG apparatus 200 to the user 102 even during vigorous activity. The flexible earpiece 250 may apply a gripping force to the ear of the user 102 when the user 102 is wearing the wearable EEG apparatus 200. In some examples, the housing 210 is configured to translate the gripping force of the flexible earpiece 250 to the EEG sensors 220, causing the EEG sensors 220 to press firmly against the user 102 to facilitate receiving a strong EEG signal.

As shown in FIGS. 1 and 2 together, an imaging system 240 is mounted at the front of the front section 211 of the housing 210, with a lens that is positioned toward the user's face and configured to capture images of objects in the field of view 114 of the imaging system 240. The imaging system 240 may be mounted on the housing 210 so that the field of view 114 includes devices 130 that are within the field of view of the eyes of the user 102 when the user 102 is wearing the wearable EEG apparatus 200.

The housing 210 may enclose other components of the wearable EEG apparatus 200, e.g., to protect the components from damage or exposure to hazards. The components may include items such as those illustrated in FIG. 10, including a communication device 1010 that includes a transmitter, a processor 1005 in communication with the transmitter, the EEG sensors (220 in FIG. 2, 1020 in FIG. 10), and the imaging system (240 in FIG. 2, 1040 in FIG. 10). The components may also include wiring and interfacing components, such as signal conditioning components (e.g., band-pass filters), some of which may be mounted on printed circuit boards (PCBs) enclosed within the housing 210. The processor 1005 may have associated memory containing programming instructions that, when executed, cause the processor 1005 to implement methods, such as detecting brain activity and controlling one or more devices 130 based on the detected brain activity. The components may also include a power source 1080 (e.g., a rechargeable battery) providing power to electrical components of the wearable EEG apparatus 200. The battery may be sized to allow for extended use of the wearable EEG apparatus 200 between charges. Furthermore, the processor 1005 may be a low-power component, e.g., designed for use in a mobile phone. The battery may be charged though an electrical connection or by inductive wireless charging, and the wearable EEG apparatus 200 may harvest energy from the environment to extend the time between recharges. In some examples, the wearable EEG apparatus 200 includes a photovoltaic device disposed on a portion of the housing 210.

As noted above, in some examples, three EEG sensors 220 are disposed on the housing 210 so that the EEG sensors 220 contact the user 102 at specific locations on the user's head. For example, the third EEG sensor 220c may contact the user 102 below the user's ear, at a location of low EEG signal strength. At this location, the third EEG sensor 220c may act as a ground reference relative to the other two EEG sensors 220a, 220b by being placed on or near the midline sagittal plane of the skull, where lateral hemispheric cortical activity is largely not detected. The second EEG sensor 220b may contact the user near the user's temple, at a location of relatively high EEG signal strength. In some examples, a filter, such as a band-pass filter, attenuates less relevant signals from the second sensor 220b. For example, the band-pass filter may pass beta waves (e.g., signals in the range from 20-30 Hz), while attenuating delta, theta, gamma, and alpha waves. In some examples, the processor 1005 may adjust parameters of the filter, e.g., to pass alpha wave signals in lieu of beta wave signals or to switch between passing alpha wave signals and passing beta wave signals. The first EEG sensor 220a may contact the user behind the user's ear at a location of relatively lower EEG signal strength than the location of the second EEG sensor 220b.

Some variations of the devices may have additional EEG sensors located in different locations. Other devices may have fewer than three sensors. For example, the system may operate with only the first EEG sensor 220a positioned over the user's temple and frontal lobe and the third EEG sensor 220c providing a ground reference. Alternatively, the system may operate with only the second EEG sensor 220b positioned under the helix of the user's ear and over the user's temporal lobe and the third EEG sensor 220c providing a ground reference.

Figure 3:
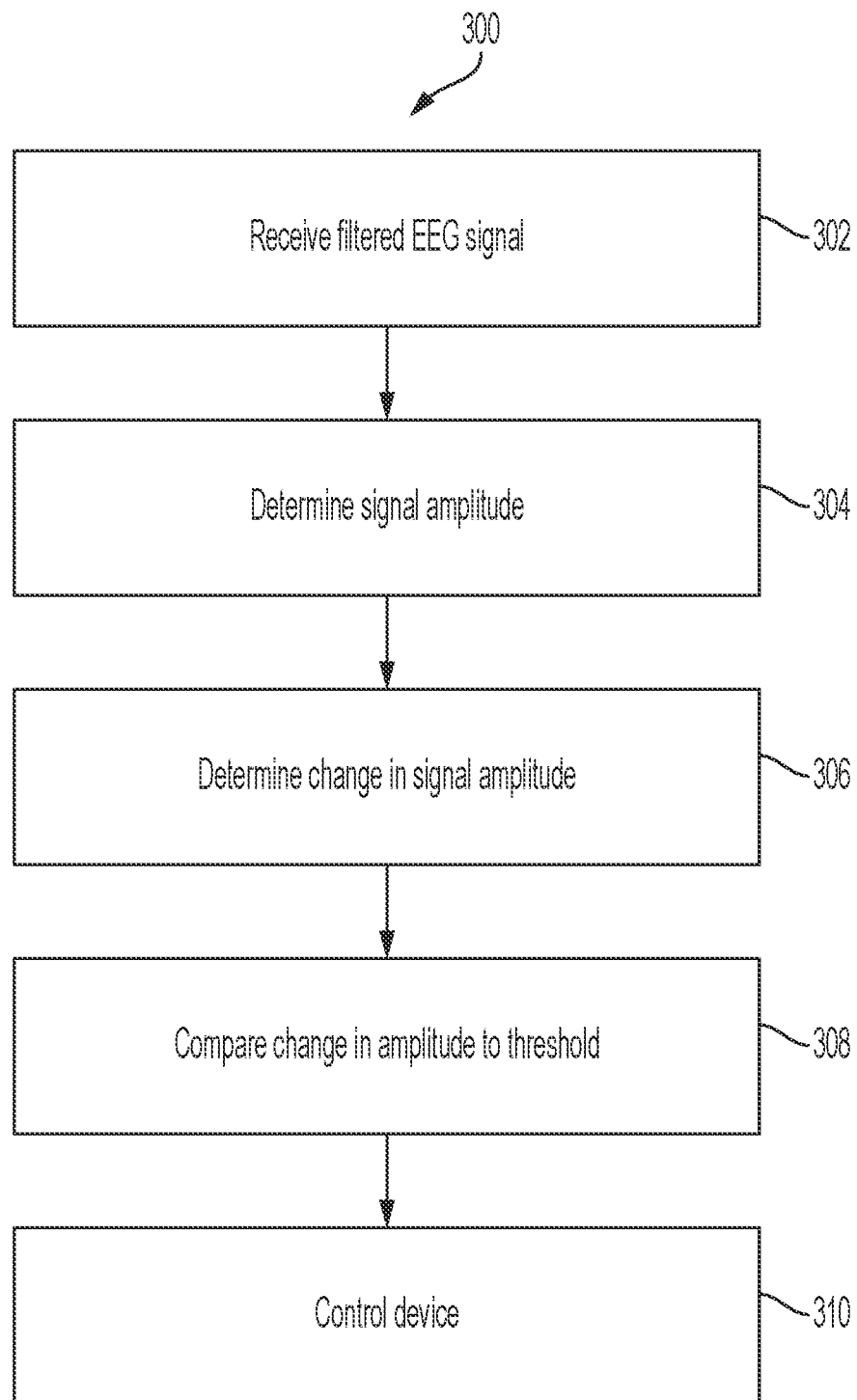
FIG. 3 is a flowchart of a method of detecting brain activity.

FIG. 3 shows a method 300 of detecting brain activity to determine when the brain activity of a user of the device indicates an increase in the user's focus. At step 302, the method 300 includes receiving, by the processor of the wearable EEG device or of a separate electronic device that is in communication with and proximate to the wearable EEG device, the filtered EEG signals from one or more EEG sensors 220. The processor may sample the filtered brain-wave signals, e.g., using an analog-to-digital converter (ADC) to determine a representative amplitude 304 of the brain wave signal in the pass band. The representative amplitude may be a root mean square (rms) value or other value representing the level of brain activity within the frequency range of the pass band. In some examples, as time progresses the processor determines a difference 306 between the representative amplitude of the brain wave signal from the first EEG sensor 220a and the second EEG sensor 220b to determine the level of brain activity. The filter and ADC may be disposed on a daughter PCB interfaced with the processor PCB. In some examples, the EEG sensors filter and sample the brain wave signals and provide digital representations of the signals to the processor, e.g., through a serial or parallel data bus. The processor may receive 302 EEG signals at irregular or regular intervals of time, such as twice per second. At step 306, the processor may further measure a change in the representative level of brain activity between interval by comparing one level of a first interval with a second level of a previous (or subsequent) interval.

In some examples, the processor compares the measured change in representative level of brain activity to a threshold 308. When the change in representative level of brain activity exceeds the threshold, the processor may determine that the user's focus has increased. The threshold may be based on a baseline level of brain activity of the user. In some examples, the user triggers the wearable EEG apparatus 200 to determine the baseline level of brain activity of the user, e.g., through an application 710 (FIG. 7) executing on the computing device or through an actuator on the wearable EEG apparatus 200, e.g., by pressing a button located on the housing 210. In other examples, wearable EEG apparatus 200 automatically determines the baseline level of brain activity of the user 102, e.g., as an average or mean level over a period of time, with fluctuation in the representative level of brain activity of the user 102 over that period of time.

In some examples, wearable EEG apparatus 200 includes a data store 800 (FIG. 8) containing descriptive information for known devices. Referring back to FIG. 2, the imaging system 240 is configured to capture images of objects in the field of view 114 of the imaging system 240. When a device 130 is in the field of view of the imaging system 240, the wearable EEG apparatus 200 may recognize the device 130, based on images captured by the imaging system 240, and select the device 130 from the known devices contained in the data store 800. Example image recognition methods will be described below in the discussion of FIG. 4.

At step 310, in response to the user's increase in focus, the processor 1005 may perform functions to control the selected device 130. In some examples, the data store 800 also contains patterns or features 808 (FIG. 8) associated with each known device. The pattern may be a previously captured image of the device 130, or the pattern may include features of the device 130 extracted from the previously captured image of the device 130, e.g., by image processing. The extracted features may include colors of surfaces of the device 130, geometric features, such as detected edges of the device 130, or patterns, textures, or shapes of a surface of the device 130. In some examples, the pattern includes an April tag, barcode, QR code, or other form of computer-readable data associated with the device 130, e.g., affixed to a surface of the device. In some examples, the extracted feature includes a symbol or pattern of symbols imprinted on the surface of the device 130, such as a logo. The extracted features may include knobs, switches or other controls associated with the device 130 or text or other display information associated with the device 130.

Figure 4:
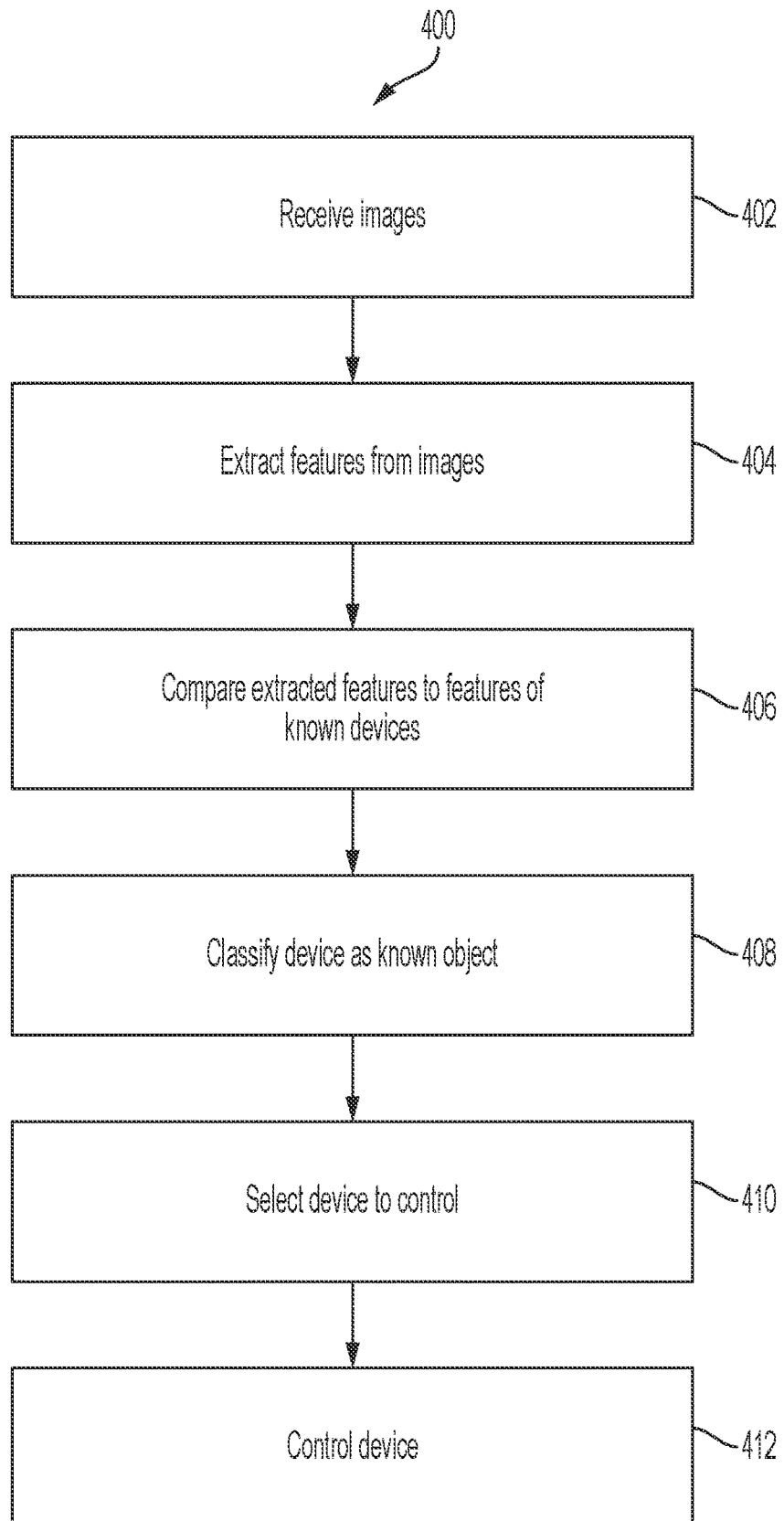
FIG. 4 is a flowchart of a method of detecting devices to control.

FIG. 4 shows a method 400 of detecting devices 130 to control. At step 402, the processor 1005 may receive images from the imaging system 240 and may extract, at step 404, features from the received images. Features may include characteristics of the image, such as overall shape as well as corners, edges, relationships between corners and edges, colors, patterns, etc. In some examples the processor 1005 executes a Scale Invariant Feature Transform (SIFT) or similar algorithm to locate one or more "keypoints" of the image. A "keypoint" is a feature which is unaffected by the size, aspect ratio or other asymmetry of a shape in the image. The processor may construct a scale space to ensure that the keypoints are scale-independent, ensure the keypoints are rotation invariant (unaffected by the orientation of the image), and assign a unique identifier to the keypoint. In some embodiments, the unique identifier may be a 128 bit or 256 bit Binary Robust Independent Elementary Features (BRIEF) descriptor. In some examples, the processor executes a Features from Accelerated Segment Test (FAST) corner-detection algorithm to extract features. The processor 1005 may execute functions of a software library, such as the python module ORB (Oriented FAST and Rotated BRIEF), to perform feature extraction. The processor 1005 may compare, at step 406, the received image and/or the features extracted from the received image with features associated with known devices contained in the data store 800. For example, the processor 1005 may compare unique identifiers assigned to keypoints of the image with unique identifiers assigned to keypoints of previously captured images of known devices. The processor 1005 may select, at step 408, a device 130 from the known devices when a threshold number of extracted features match features of previously captured images. For example, each known image contained in the data store 800 may include, e.g., 30 or more features 808 extracted from a previously captured image of the device 130. In this example, the processor 1005 may select the device 130 from the known devices when more than ten features match. The processor 1005 may also select the device 130 having the greatest number of matching features when more than one of the known devices has more than the threshold number of matching features extracted from the captured image of the device 130.

Figure 5:
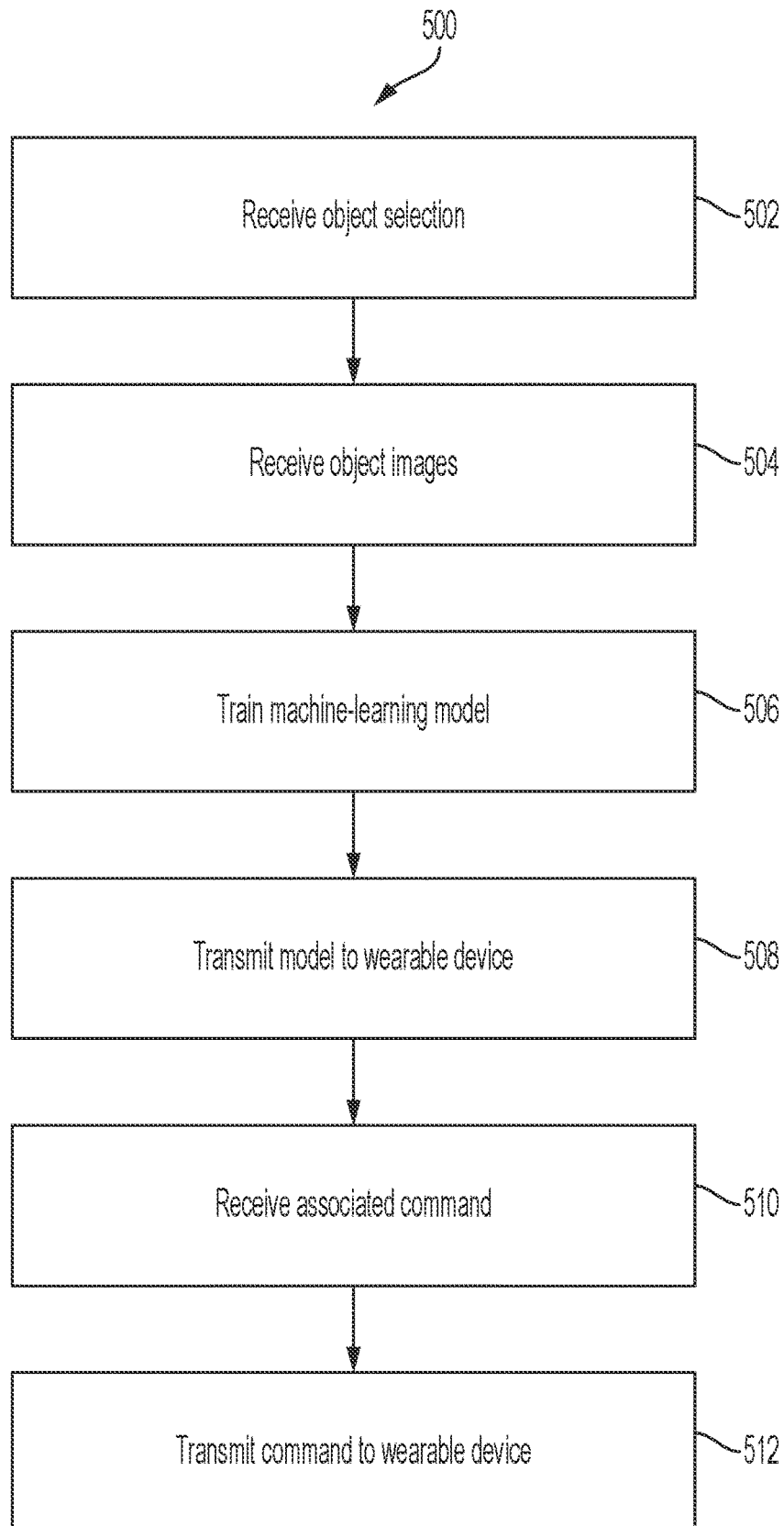
FIG. 5 is a flowchart of a method of training a machine-learning model.
Figure 7:
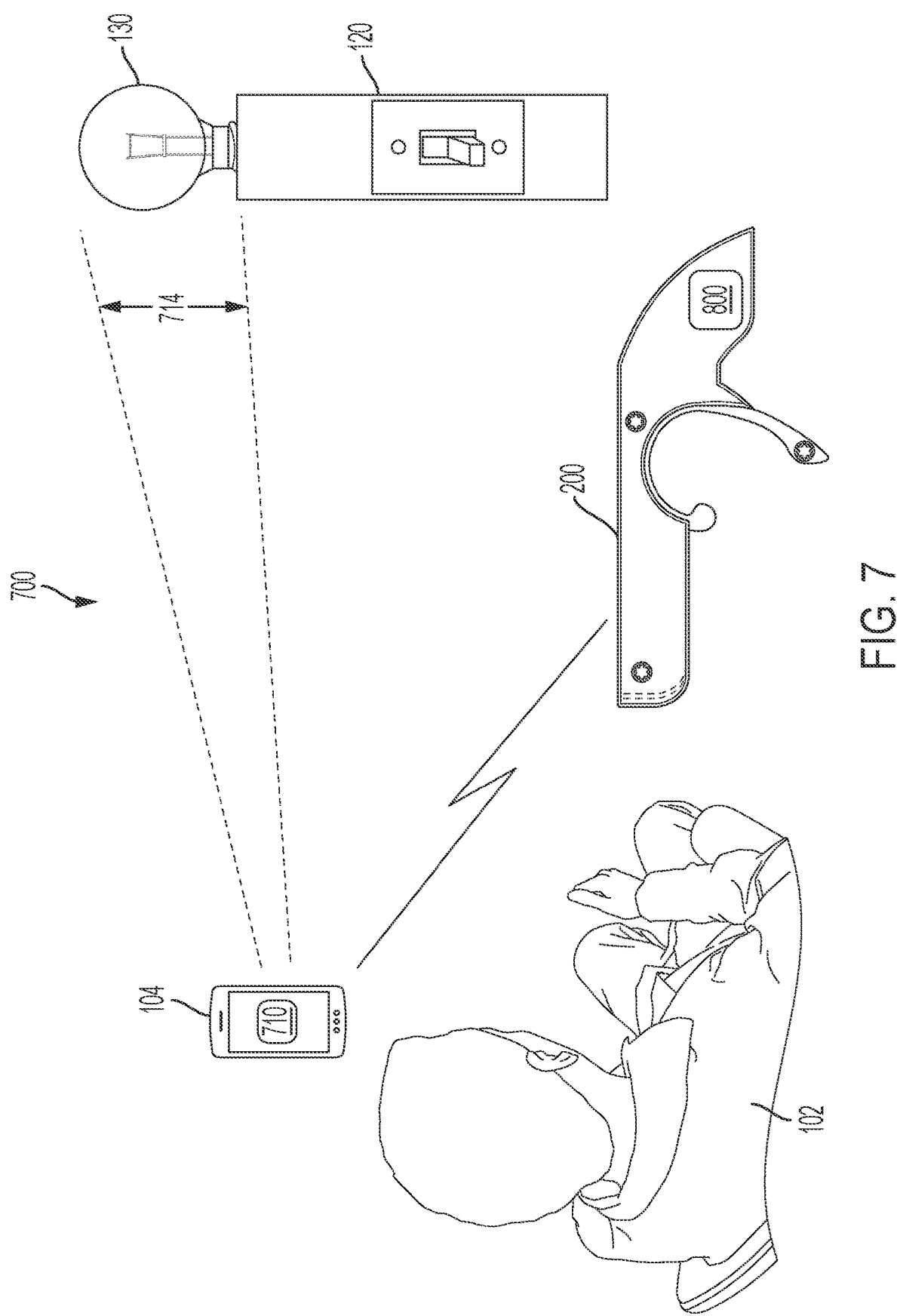
FIG. 7 shows an example environment for managing a data store of the example wearable EEG apparatus.

Alternatively, to classify the device at 408 the wearable EEG apparatus 200 may use a machine-learning algorithm to recognize the device 130. For example, the processor 1005 may provide the received image to a deep-learning neural network, such as a convolutional neural network (CNN) trained to recognize known objects. FIG. 5 shows a method 500 of training a machine-learning model (such as a deep-learning neural network) to recognize a known device 130 to control. In some examples, the user (or other supervised trainer) trains the deep-learning neural network using several images of the known object. At step 502, the method 500 includes receiving an object selection. For example, the user may cause the system to select an object in the scene as the known device 130 by acquiring an image of the object, e.g., through an application 710 (FIG. 7). The user may label or annotate the selected object via the application 710. The system may first acquire a single reference image of the object, and extract features from the image as described above. At step 504, the method 500 includes receiving object images. For example, the user may cause the system to acquire one or more still images or to acquire a continuous video at a fixed frame rate, such at 60 frames per second, for a period of time, such as 10 seconds). The system may acquire the additional images at various angles with respect to the object, at various distances from the object, under various lighting conditions, and/or other circumstances providing variation of the appearance of the object in the image. For example, the system may acquire a video of the object while the user walks around the object and/or walks toward or away from the object, and/or while increasing or decreasing the light shining on the object. In some examples, the system receives the additional images from a data store of images of the object. These additional images serve as additional training images for training the deep-learning network to recognize the object as the known device 130.

In some examples, the system then performs image processing on the additional images to prepare the additional images for use as training images. For example, the system may determine a region of interest around the known device and crop out portions of additional images which are unrelated to the known device. In some examples, the user may draw bounding boxes around the known device in the additional images, and in response the system disregards the portion of the images outside the bounding boxes. In some examples, bounding boxes are determined automatically using image processing. For example, the system may apply an image-processing algorithm to extract features, such as keypoints, of objects in the first (reference) image. The system may then compare the features extracted from the reference image to features extracted from the additional images. The system may apply one or more bounding boxes to the additional images and adjust aspects of the bounding boxes, such as dimensions and orientation until a threshold number of features extracted from the portion of the additional images within the bounding box match features extracted from the reference image. For example, the system may scale dimensions of the bounding box up and down, or the position or orientation of the bounding box up and down, back and forth, and/or through a range of linear or angular values while processing the image. The system may discard ranges of dimensions and/or angles of the bounding box that are not associated with the threshold number of matching features. One set of dimensions and/or orientations associated with the threshold number of matching features may be retained for training. If no bounding box results in the threshold number of matching features (i.e., if the threshold number of matching features cannot be extracted from the entire image), the system may discard the reference image itself. Thus, the process that the system follows to implement the image-processing algorithm disregards images or portions of the additional images unrelated to the known device prior to training the deep-learning network. At step 506, the method 500 includes training a machine-learning model. The portion of the additional images contained within the bounding boxes may be input into the deep-learning neural network, thus training the deep-learning neural network to recognize the known device in a variety of circumstances (e.g., including various magnifications, orientations, and lighting). After training, the deep-learning neural network may predict the probability that the known device is in a newly acquired image. At step 508, the method 500 includes transmitting the trained deep-learning neural network to the wearable EEG apparatus 200. One or more trained deep-learning neural network may be stored in the data store 800 of the wearable EEG apparatus 200 and applied to images acquired by the wearable EEG apparatus 200. In some examples, one or more deep-learning neural networks may determine a probability that the known device 130 is in the newly acquired image. The one or more deep-learning neural networks may detect that the known device 130 is in the newly acquired image when the predicted probability satisfies or exceeds a threshold. At step 510 and 512, the method 500 includes receiving a command associated with the known device 130 and transmitting the associated command to the wearable EEG apparatus 200. The user may provide commands or functions associated with one or more deep-learning neural network, as described in FIG. 8, so that when the deep-learning neural network recognizes an object, the wearable EEG apparatus 200 executes the associated command or function.

When the wearable EEG apparatus 200 classifies an object and the object satisfies one or more other threshold conditions, at 410 the system may select the device as an object that the EEG apparatus 200 will control. For example, the system may detect multiple devices in a field of view of the EEG apparatus's camera. To determine which of the devices will be controlled, the system may require that the device to be controlled is centrally positioned within the field of view, such as over the center point or within a threshold distance of the center point of the field of view, for at least a threshold period of time. The system also may require that the user's focus have increased while the device is within the central location or the field of view in order to select the device to control. (Methods of determining whether focus has increased are described above in the discussion of FIG. 3). Once the EEG apparatus 220 selects the device 130 as a device to be controlled, the wearable EEG apparatus 200 may control 412 one or more functions or characteristics of the device 130.

The wearable EEG apparatus 200 may further include an accelerometer, Inertial Measurement Unit (IMU), or other position/orientation sensor 260 (FIG. 2) in communication with the processor 1005 and providing position/orientation information to the processor 1005. In some examples, the IMU is disposed within the housing 210 at a position between the user's ear and the user's temple, or other suitable location which tracks well with movement of the user's head. The processor 1005 may determine that the device 130 includes an electronic interface capable of receiving position/orientation information. For example, the processor 1005 may determine that device 130 is capable of discovering a Bluetooth mouse, trackball, or other wireless position-controlling computer peripheral. The processor 1005 may cause the wearable EEG apparatus 200 to interface with (e.g., pair with) with the device 130 and use information from the position/orientation sensor 260 to control a cursor location or other point of focus associated with the device 130. For example, the wearable EEG apparatus 200 may transmit relative X-axis and Y-axis data to the device 130, e.g., according to the Bluetooth Human Interface Device (HID) profile. The X-axis and Y-axis data may indicate a number of pixels to move the device's cursor from its current position. The user 102 of the EEG apparatus 200 may adjust the cursor location on the display screen by changing the orientation of the wearable EEG apparatus 200, thus changing the orientation of the position/orientation sensor 260. For example, tilting the user's head up and down will cause a corresponding change in orientation of the IMU. The system will measure changes in one or more values of the position/orientation as the user's head tilts up and down. The system may scale the measured changes of position/orientation by a proportionality constant to determine a number of pixels to move the cursor up or down. The system then sends the scaled measurement data as, e.g., relative Y-axis data to the device 130, causing the cursor to move up and down in response to the user's head tilting up and down. Similarly, the system may send relative X-axis data to the device 130 as the user's head moves side to side, causing the device's cursor to move back and forth.

Figure 6A:
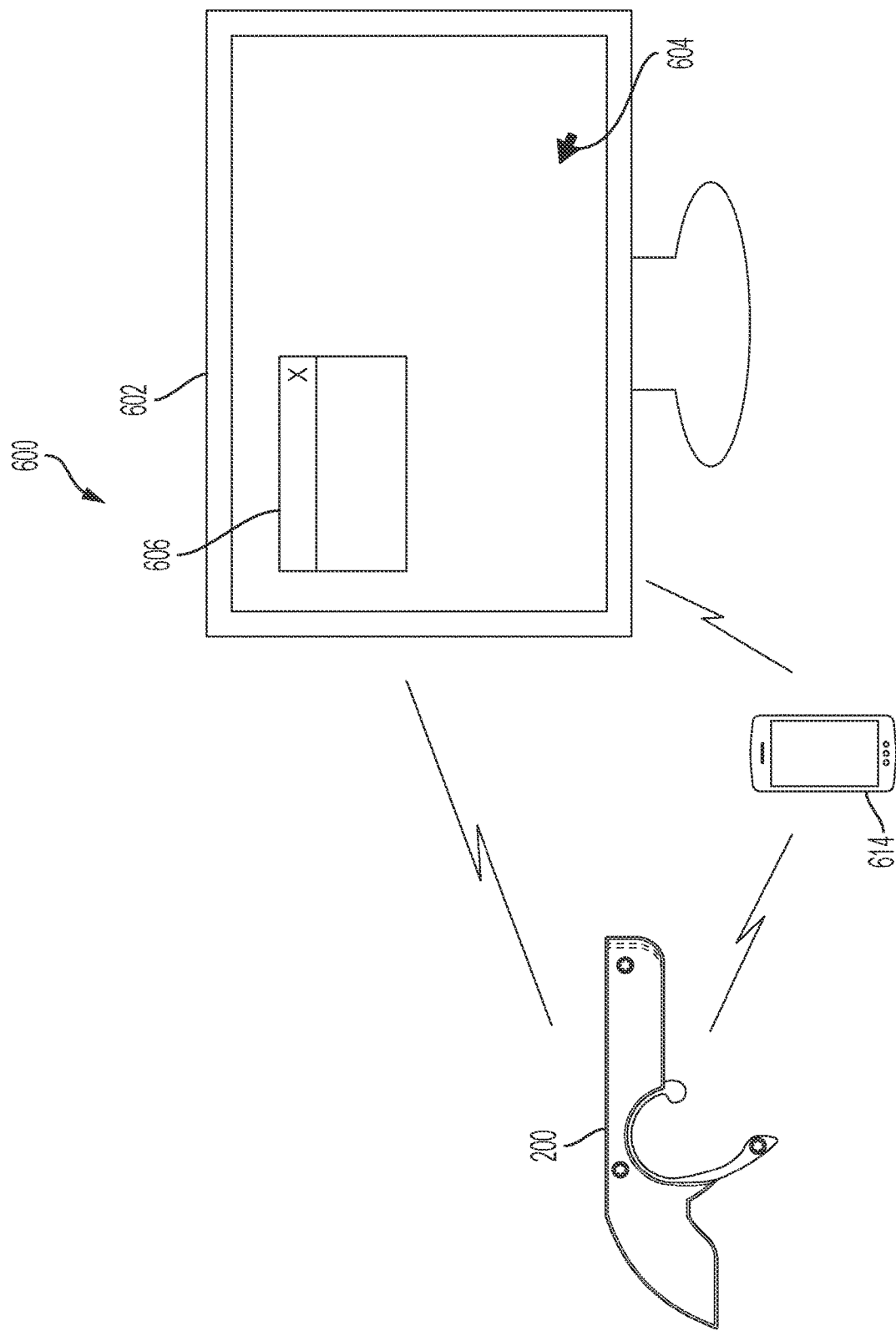
FIGS. 6A and 6B show an example environment for controlling a cursor position based on brain activity.

For example, FIG. 6A shows an example environment 600 for controlling the location of a cursor 604 on a controllable display screen 602 of a computer system. The environment 600 includes a controllable display screen 602 of a computer system displaying a selectable window 606 and a cursor 604. The computer system may include a device controller application and communicate directly with the EEG apparatus via near-field or other wireless communication protocols. Alternatively, the environment 600 also may include a portable electronic device 614 on which a device controller application is installed. Once the EEG apparatus 200 recognizes the display screen 602 using processes such as those described above in the discussion of FIG. 4, it may then use movement of the EEG apparatus 200 to control movement and activation of the cursor 604. The cursor 604 is shown as located near the lower right corner of the display screen 602 in FIG. 6A, but in practice the cursor 604 may start in any position of the display screen 602.

Figure 6B:
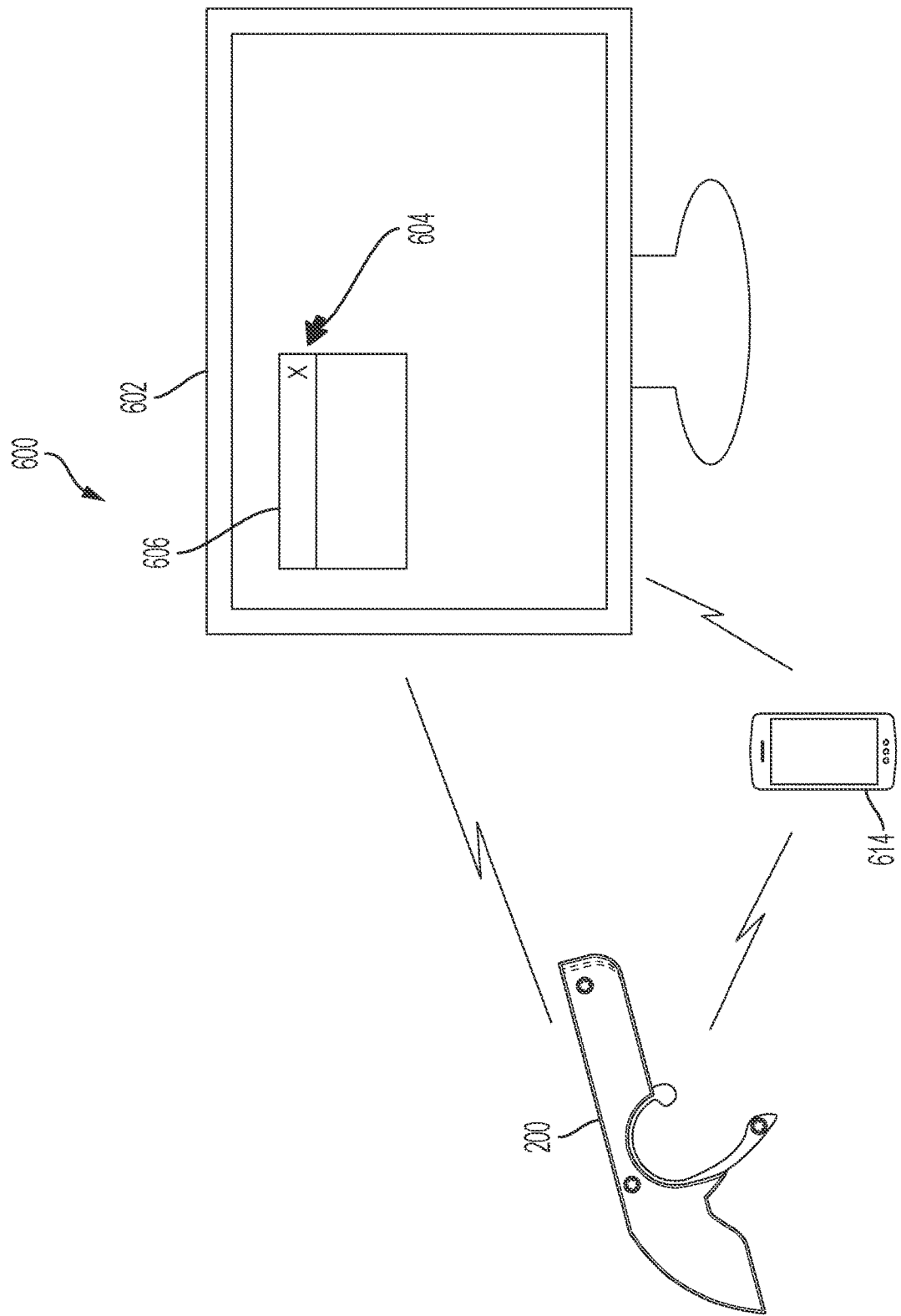

The user 102 of the EEG apparatus 200 may adjust the cursor location on the display screen by changing the orientation of the wearable EEG apparatus 200, thus changing the orientation of the position/orientation sensor 260. The device controller application of the portable electronic device 614 or of the computer system with then generate a command to move the cursor to a location that corresponds to movement of the position/orientation sensor. For example, referring to FIG. 6B, the cursor 604 has been moved to a higher location on the computer screen 602 in response to the wearable EEG apparatus 200 tilting upward. In some examples, the system will determine a reference point, such as the position of the cursor 604 on the display screen 602 when the system detects a certain trigger, such as a determination that the user's focus has remained at or above a threshold for at least a minimum amount of time, or a determination that the cursor 604 and/or the display screen 602 is centrally located (i.e. within a threshold range of a center point) in a field of view of the imaging system of EEG apparatus 200 for at least a minimum period of time. When the trigger happens, the system will determine initial position and/or orientation values of the EEG apparatus' position/orientation sensor and save that information to onboard memory. The system will measure changes in one or more values of the position/orientation sensor as compared to the reference point.

The processor may further determine that device 130 is capable of receiving a select event (e.g., mouse left click), e.g., according to the Bluetooth Human Interface Device (HID) profile. The processor may cause the wearable EEG apparatus 200 to transmit a select event to the device 130 in response to determining that the user's focus has increased. In the example shown, the user may position the cursor 604 within the window 606 (e.g., over the selectable close button, shown as an X in the title bar of the window) and select the window or a function of the window (e.g., selecting the close function to close the window). In this way, wearable EEG apparatus 200 may control large presentation screens, video games, mobile computing platforms such as smart phones, smart televisions, automobile infotainment systems, and other electronic devices with movable cursors. The user 102 may position the cursor at a desired location, then, by focusing on the location, cause the position or object on the screen to be selected. In some examples, the wearable EEG apparatus 200 will pair with multiple devices 130 simultaneously. In some examples, the wearable EEG apparatus 200 will only pair with the device 130 if the device 130 is contained in the data store 800 of the wearable EEG apparatus 200 and is recognized by the wearable EEG apparatus 200.

FIG. 7 shows an example environment 700 for managing the data store 800 of the wearable EEG apparatus 200. Here, a computing device 104 associated with the user 102 may execute an application 710 which manages the known devices in the data store 800 of the wearable EEG apparatus 200. In some examples, the application 710 executes on a remote server, such as a web server that the user 102 accesses via the computing device 104. The application 710 may capture images of objects, such as the device 130, in the field of view 714 of an imaging system of the computing device 104 and extract features from the captured image of the device 130, e.g., by image processing. In some examples, images of devices 130 are uploaded to the computing device 104 through a computer network or bus. The application 710 may present images of devices 130 to the user 102. In response, the user 102 may select the device 130 as a known device to include in the data store 800 of the wearable EEG apparatus 200. In response, the application 710 may cause the computing device 104 to transmit the selected device 130 (and patterns associated with the selected device 130) to the wearable EEG apparatus 200. The wearable EEG apparatus 200 may add the selected device and patterns 808 associated with the selected device, such as the captured image and/or the extracted features, to the data store 800. In some examples, the computing device 104 receives a list of known devices contained in the data store 800 of the wearable EEG apparatus 200. The application 710 may present the list to the user 102, so that the user 102 may select devices to be removed from the list of known devices contained in the data store 800. In response to selections by the user 102, the application 710 may cause the computing device 104 to transmit the selected devices to the wearable EEG apparatus 200, causing the wearable EEG apparatus 200 to remove the selected devices from the data store 800. Using the application 710 in this way allows the user to add, remove, and update objects included in the list of known devices contained in the data store 800 of the wearable EEG apparatus 200.

Figure 8:
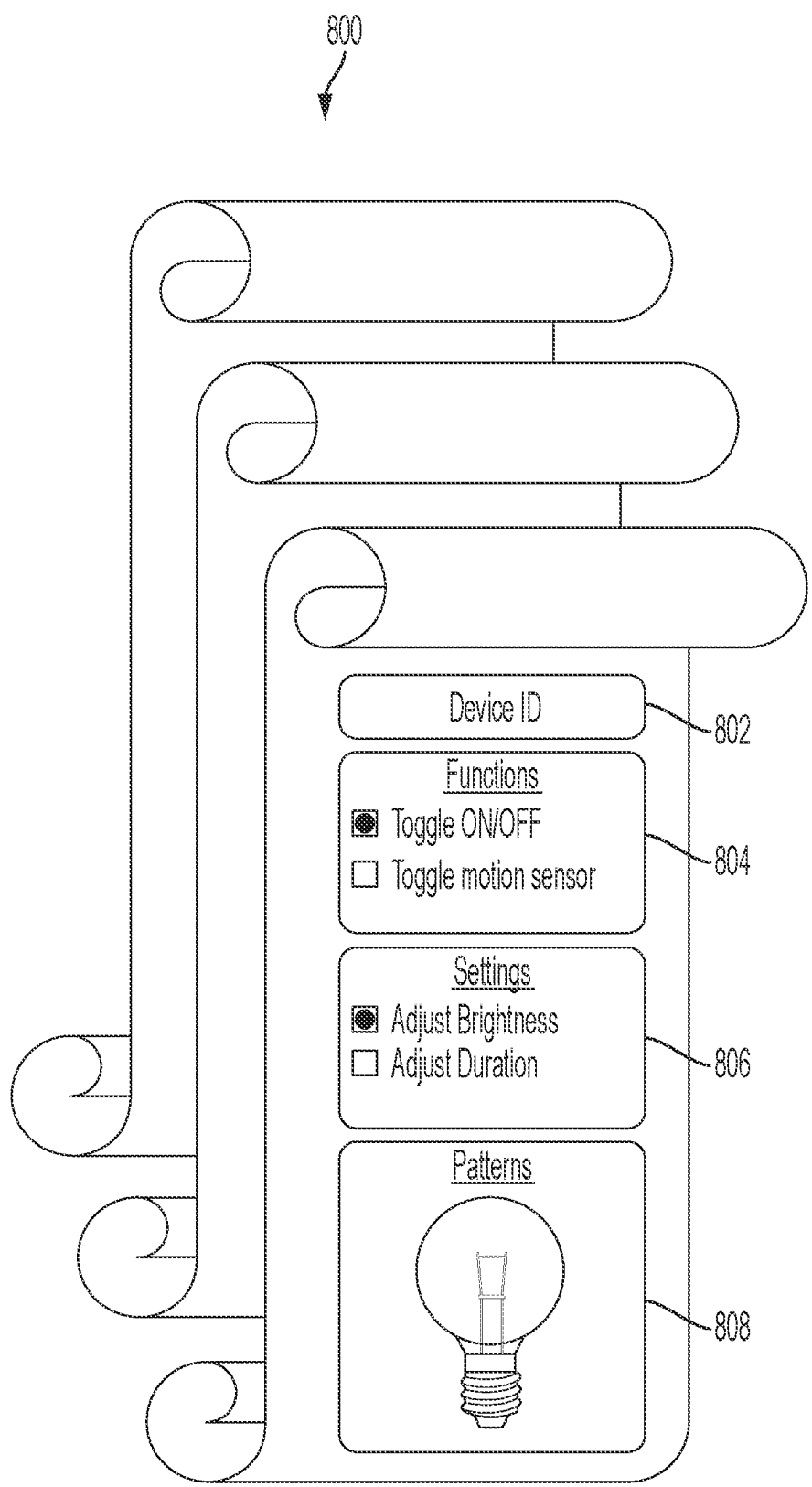
FIG. 8 shows details of the data store.

FIG. 8 shows details of the data store 800. Each known device 130 may have an associated device ID 802. In some examples, the list of known devices includes functions 804 associated with each device 130. Example functions include activate/deactivate, open/close, step to a next element or position in a sequence (e.g., tune a radio or television receiver to a next station, or toggle through setting of COOL, OFF, and HEAT of a climate control system, or speeds of a cooling fan). Some devices 130 may have more than one associated function 804. For example, a cooling fan having multiple fan speeds may also include a light which can be turned on and off. As shown in FIG. 7, the light bulb can be toggled between the ON state and the OFF state. In addition, a motion sensor associated with the light bulb (which may activate the light when it detects motion near the light) can also be toggled between an active and inactive state. In some examples, the application 710 allows the user 102 to select the function performed by the wearable EEG apparatus 200 in response to the user's increase in focus. Here, the function the state of the light bulb is selected. The application 710 may provide a list of functions associated with each known device for the user to select from. The application 710 may allow the user to define additional functions 804 associated with each known device (or group of known devices). For example, the application 710 may allow the user to enter additional functions according to the syntax of a command language or script language, such as TCL, perl, or python, or according to the syntax of a general-purpose computing language, such as Java. The application 710 may cause the computing device 104 to transmit the defined and/or selected functions to the wearable EEG apparatus 200, causing the wearable EEG apparatus 200 to execute the function in response to the user's increase in focus. In some examples, the application 710 may download functions from a repository of functions associated with a device or class of devices. The application 710 may also upload functions to the repository, e.g., after a suitable degree of testing.

In some examples, the list of known devices includes settings 806 associated with each device 130. The processor 1005 may determining a change in position or orientation of the wearable EEG apparatus 200, e.g., based on information received from a position/orientation sensor 260. In response to determining a change in position or orientation, the processor 1005 may perform functions to control a setting of the selected device 130. For example, in response to the user's head moving from a downward facing position to a more upward facing position, the processor 1005 may cause a volume setting of the selected device 130 to increase. Similarly, in response to the user's head moving from an upward facing position to a more downward facing position, the processor 1005 may cause a volume setting of the selected device 130 to decrease. As in the case of functions associated with the device 130, the application 710 may allow the user 102 to define additional functions 804 associated with each known device (or group of known devices) and to select the setting to control by the wearable EEG apparatus 200 in response to the change in position or orientation. In this way, a user 102 may activate or deactivate a device 130 based on a level of focus and may adjust a setting of the device 130 based on movements of the user's head.

Figure 9A:
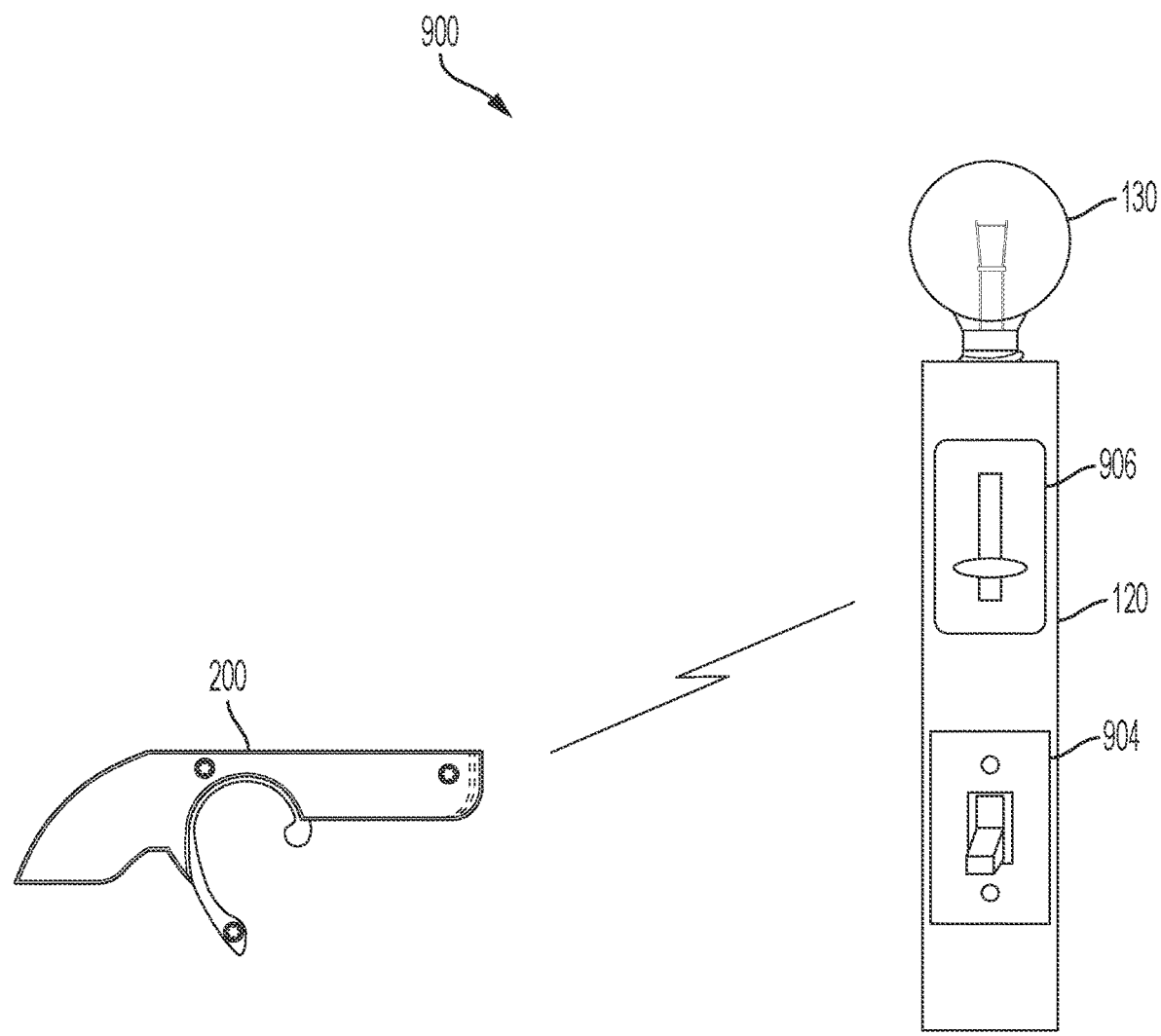
FIGS. 9A and 9B show an example environment for controlling a device based on brain activity.
Figure 9B:
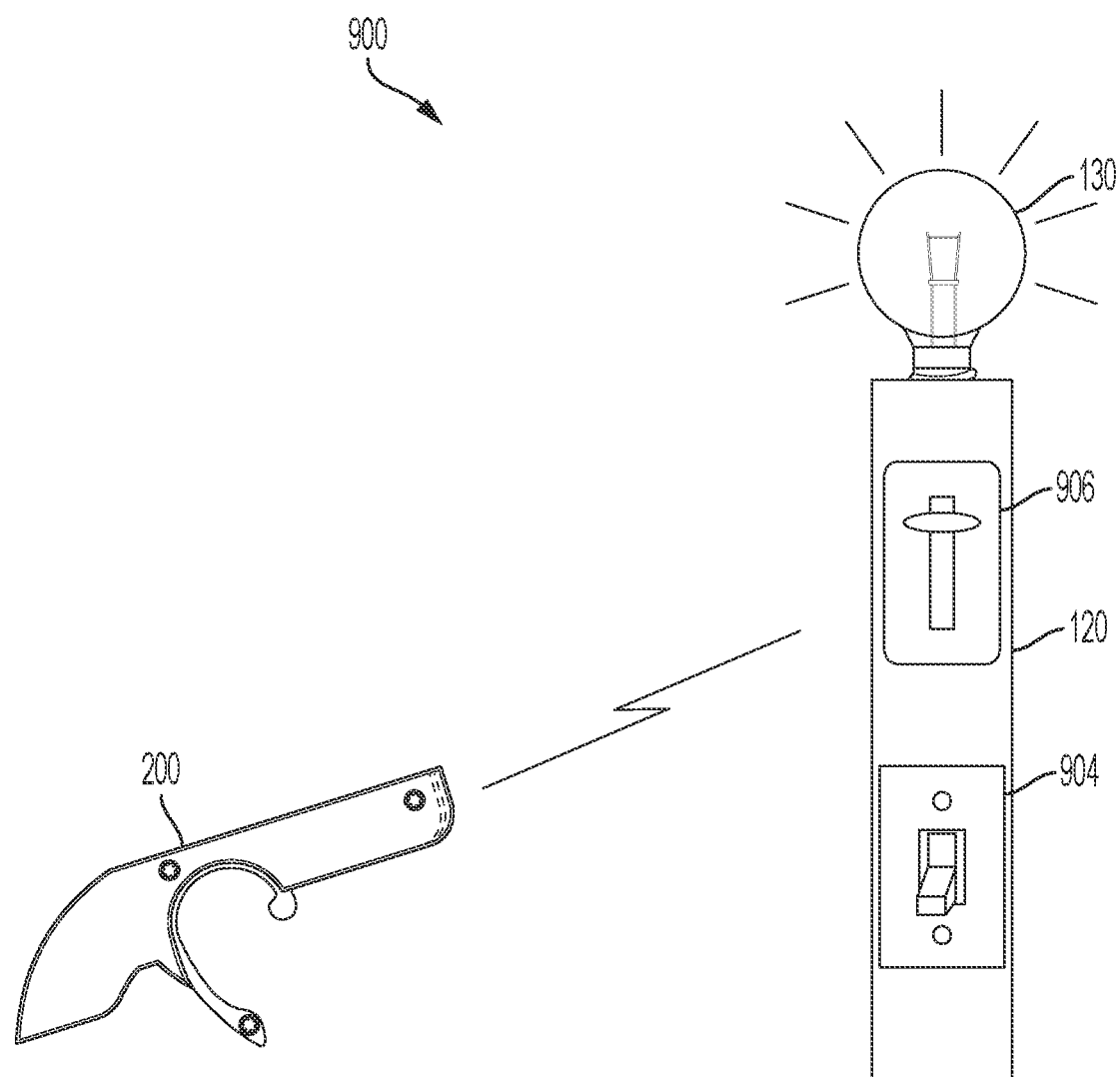

FIG. 9A shows an example environment 900 for controlling a setting 806 associated with a device 130. The environment 900 includes a light bulb 130 controlled by a device controller 120. The device controller 120 includes an activation controller 904 capable of switching the light bulb 130 on and off and a dimmer controller 906 capable of adjusting the brightness of the light bulb 130, e.g., by adjusting the current flowing through the bulb 130. Here, the setting 806 of the dimmer controller 906 is a relatively low value, corresponding to a low level of brightness. Referring to FIG. 9B, the setting 806 of the dimmer controller 906 has been moved to a higher value in response to the wearable EEG apparatus 200 tilting upward. Processes of detecting the device and detecting movement of the wearable EEG apparatus may be as those described above. For example, the system may calculate a brightness increase or decrease to match (or be a function of) the amount by which the device's yaw has increased or decreased. As described previously, in response to detecting the brain activity, the wearable EEG apparatus 200 may also transmit a signal to the device controller 120, causing the device controller 120 to turn the light on or off via the activation controller 904. Using the wearable EEG apparatus 200 in this way, a user 102 may turn the light 130 on or off based on a level of focus, and the user may adjust the brightness of the light 130 based on movements of the user's head. The wearable EEG apparatus 200 may be used to activate/deactivate and adjust settings of a variety of devices 130, including turning on and off and controlling the speed of a fan, activating/deactivating audio equipment and adjusting the volume, activating/deactivating a climate control system and adjusting the temperature, etc. Although FIGS. 9A and 9B show the wearable EEG apparatus 200 communicating directly with the device 130 and its device controller 120, the communications may route through one or more intermediate devices such as were shown in FIGS. 1, 6A, 6B and 7.

Figure 10:
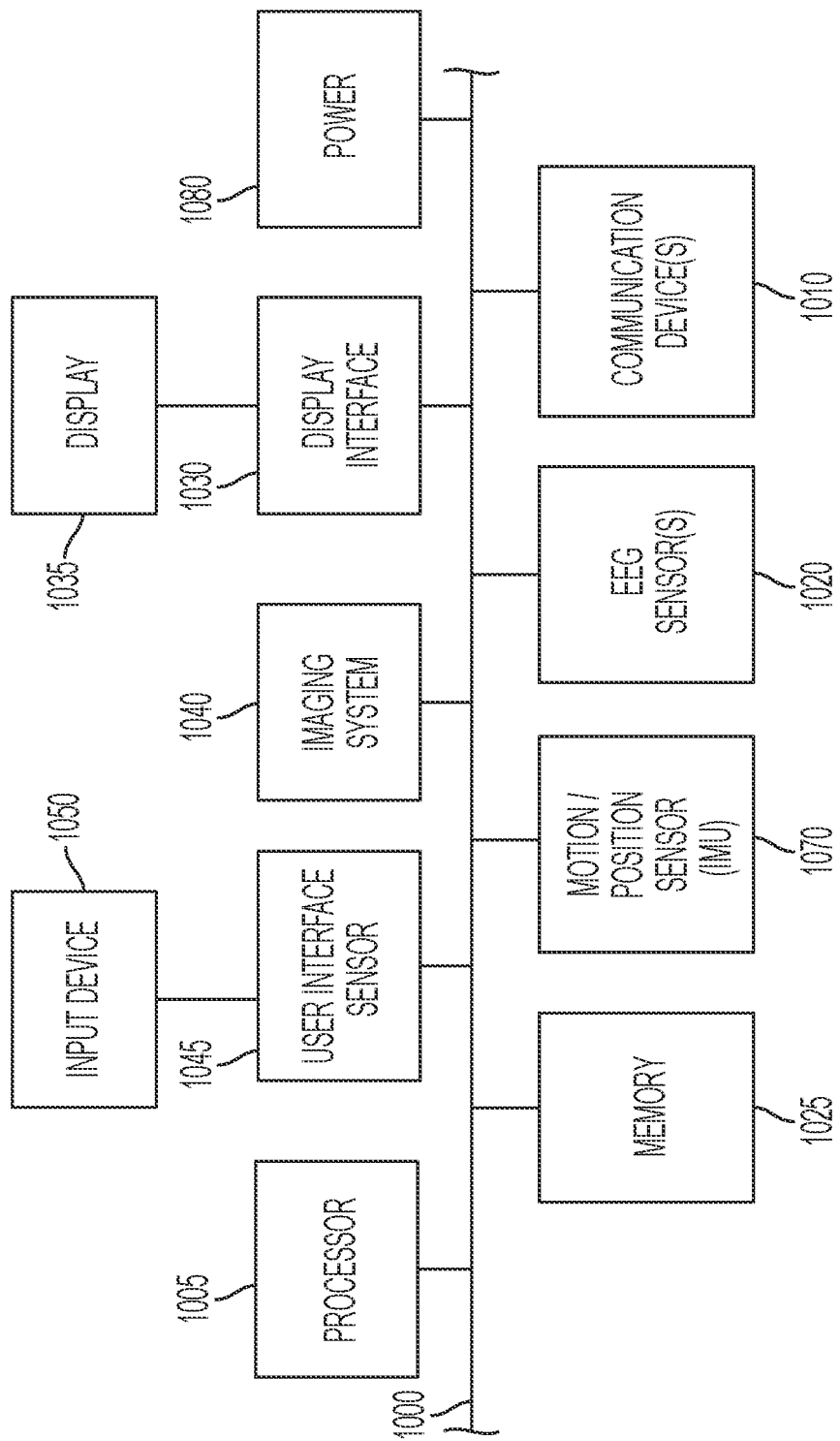
FIG. 10 illustrates a block diagram of internal hardware included in any of the electronic components of this disclosure.

FIG. 10 illustrates example hardware that may be included in any of the electronic components of the system, such as internal processing systems of the wearable EEG apparatus 200. An electrical bus 1000 serves as an information highway interconnecting the other illustrated components of the hardware. Processor 1005 is a central processing device of the system, configured to perform calculations and logic operations required to execute programming instructions. As used in this document and in the claims, the terms "processor" and "processing device" may refer to a single processor 1005 or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 1025. A memory device may include a single device or a collection of devices across which data and/or instructions are stored. Various embodiments of the invention may include a computer-readable medium containing programming instructions that are configured to cause one or more processors to perform the functions described in the context of the previous figures.

An optional display interface 1030 may permit information from the bus 1000 to be displayed on a display device 1035 in visual, graphic or alphanumeric format, such on an in-dashboard display system of the vehicle. An audio interface and audio output (such as a speaker) also may be provided. Communication with external devices may occur using various communication devices 1010 such as a wireless antenna, a radio frequency identification (RFID) tag and/or short-range or near-field communication transceiver, each of which may optionally communicatively connect with other components of the device via one or more communication system. The communication device(s) 1010 may include a transmitter, transceiver, or other device that is configured to be communicatively connected to a communications network, such as the Internet, a Wi-Fi or local area network or a cellular telephone data network, or to make a direct communication connection with one or more nearby devices, such as a Bluetooth transmitter or infrared light emitter.

The hardware may also include a user interface sensor 1045 that allows for receipt of data from input devices 1050 such as a keyboard or keypad, a joystick, a touchscreen, a touch pad, a remote control, a pointing device and/or microphone. Digital image frames also may be received from a camera 1040 that can capture video and/or still images. The system also may receive data from one or more sensors 1020 such as EEG sensors 220 and motion/position sensors 1070, such as inertial measurement sensors.

In this document, an "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

The terms "processor" and "processing device" refer to a hardware component of an electronic device that is configured to execute programming instructions, such as a microprocessor or other logical circuit. A processor and memory may be elements of a microcontroller, custom configurable integrated circuit, programmable system-on-a-chip, or other electronic device that can be programmed to perform various functions. Except where specifically stated otherwise, the singular term "processor" or "processing device" is intended to include both single-processing device embodiments and embodiments in which multiple processing devices together or collectively perform a process.

An "imaging system" is any device or system that is capable of optically viewing an object and converting an interpretation of that object into electronic signals. One example of an imaging device is a digital camera.

A "machine learning model" or a "model" refers to a set of algorithmic routines and parameters that can predict an output(s) of a real-world process (e.g., identification or classification of an object) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology. A machine learning model may be trained on a sample dataset (referred to as "training data").

The term "bounding box" refers to a rectangular box that represents the location of an object. A bounding box may be represented in data by x- and y-axis coordinates $[x_{max}, y_{max}]$ that correspond to a first corner of the box (such as the upper right corner), along with x- and y-axis coordinates $[x_{min}, y_{min}]$ that correspond to the corner of the rectangle that is opposite the first corner (such as the lower left corner). It may be calculated as the smallest rectangle that contains all of the points of an object, optionally plus an additional space to allow for a margin of error. The points of the object may be those detected by one or more sensors, such as pixels of an image captured by a camera.

In this document, the term "wireless communication" refers to a communication protocol in which at least a portion of the communication path between a source and destination involves transmission of a signal through the air and not via a physical conductor, as in that of a Wi-Fi network, a Bluetooth connection, or communications via another short-range or near-field communication protocol. However, the term "wireless communication" does not necessarily require that the entire communication path be wireless, as part of the communication path also may include a physical conductors positioned before a transmitter or after a receiver that facilitate communication across a wireless position of the path.

When this document uses relative terms of position such as "front" and "rear", or "forward" and "rearward", it is intended to cover an arrangement in which a device is worn by a human, with the human facing in the direction that is considered to be forward or the front.

While the invention has been described with specific embodiments, other alternatives, modifications and variations will be apparent to those skilled in the art. Accordingly, it will be intended to include all such alternatives, modifications, and variations within the spirit and scope of the appended claims.

The invention claimed is:

1. A system for detecting brain waves of a person, the system comprising:
a housing configured to fit over an ear of the person, the housing comprising:
a bridge over the ear,
a first portion extending forward from the bridge to a position over a temple of the person, and
a second portion extending rearward from the bridge,
a first dry electroencephalography (EEG) sensor disposed on the second portion;
a second dry EEG sensor disposed on the first portion;
a power supply included in the housing;
a processor included in the housing;
a position sensor or an orientation sensor disposed in the housing;
a camera included in the housing and in communication with the processor; and
a transmitter included in the housing and in communication with the processor.

2. The system of claim 1, wherein the camera is disposed in the first portion and configured to capture images of objects in a field of view of the person when wearing the housing over the ear.

3. The system of claim 1, further comprising:
a flexible earpiece extending downward from the housing and positioned to fit under a lobe of the ear when worn by the person; and
a third dry EEG sensor disposed in the flexible earpiece.

4. The system of claim 1, further comprising memory disposed in the housing, wherein the memory holds a data store containing a machine-learning model trained to recognize one or more objects in an environment.

5. A method of controlling one or more objects in an environment, comprising, by a processor of an electronic device:
receiving images from a camera of the electronic device, the electronic device comprising EEG sensors and an inertial measurement unit (IMU);
processing the images to identify features corresponding to a known device;
receiving brain-wave signals from at least two of the EEG sensors and comparing the brain-wave signals to each other to measure a level of brain activity;
in response to determining that the known device comprises an adjustable setpoint, using the IMU to adjust the setpoint;
upon detection of both (a) a feature corresponding to the known device and (b) the level of brain activity deviating from a baseline by at least a threshold level, generating a command signal configured to cause the known device to actuate; and
transmitting the command signal to the known device or a controller for the known device.

6. The method of claim 5, wherein processing the images to identify features corresponding to the known device comprises:
extracting one or more image features from the images; and
comparing the image features with one or more known features corresponding to the known device, the known features extracted from previously captured images of the known device.

7. The method of claim 6, wherein comparing the image features with one or more known features corresponding to the known device comprises determining that at least a threshold number of image features correspond with known features corresponding to the known device.

8. The method of claim 5, further comprising:
in response to determining that the known device is an electronic user interface, using the IMU to select a location on the electronic user interface at which the actuation will occur.

9. The method of claim 5, further comprising receiving the images at a rate of at least two times per second.

10. The method of claim 5, wherein the feature comprises a symbol or pattern of symbols imprinted on a surface of the known device.

11. A system for controlling one or more objects in an environment, the system comprising:
a wearable over-the-ear electronic device comprising a set of dry electroencephalography (EEG) sensors, a camera, a processor, an inertial measurement unit (IMU), and programming instructions that are configured to cause the processor to:
receive images from the camera;
process the images to identify features corresponding to a known device;
receive brain-wave signals from at least two of the EEG sensors and compare the brain-wave signals to each other to measure a level of brain activity;
in response to determining that the known device comprises an adjustable setpoint, using the IMU to adjust the setpoint;
upon detection of both (a) a feature corresponding to the known device and (b) the level of brain activity deviating from a baseline by at least a threshold level, generate a command signal configured to cause the known device to actuate; and
transmit the command signal to the known device or a controller for the known device.

12. The system of claim 11, wherein the wearable over-the-ear electronic device comprises:
a housing configured to fit over an ear of a person, the housing comprising:
a bridge over the ear,
a first portion extending forward from the bridge to a position over a temple of the person, and
a second portion extending rearward from the bridge;
a first dry electroencephalography (EEG) sensor disposed in the second portion;
a second dry EEG sensor disposed in the first portion;
a power supply; and
a transmitter in communication with the processor.

13. The system of claim 11, wherein the programming instructions are further configured to cause the processor to, in response to determining that the known device is an electronic user interface, use the IMU to select a location on the electronic user interface at which the actuation will occur.

14. The system of claim 11, wherein the wearable over-the-ear electronic device further comprises:
a data store containing known features corresponding to the known device, the known features extracted from previously captured images of the known device; and
wherein the programming instructions comprise instructions to:
extract one or more image features from the received images; and
compare the image features with the known features to identify the known device.

15. The system of claim 14, wherein the instructions to compare the image features with the known features comprise instructions to determine that a threshold number of image features correspond with known features.

16. The system of claim 11, wherein the brain-wave signals comprise beta wave signals.

17. The system of claim 11, wherein the feature comprises a shape of a surface of the known device.

18. A system for detecting brain waves of a person, the system comprising:
a housing configured to fit over an ear of the person, the housing comprising:
a bridge over the ear,
a first portion extending forward from the bridge to a position over a temple of the person, and
a second portion extending rearward from the bridge,
a first dry electroencephalography (EEG) sensor disposed on the second portion;
a second dry EEG sensor disposed on the first portion;
a power supply included in the housing;
a processor included in the housing;
memory disposed in the housing, wherein the memory holds a data store containing a machine-learning model trained to recognize one or more objects in an environment;
a camera included in the housing and in communication with the processor; and
a transmitter included in the housing and in communication with the processor.

19. The system of claim 18, wherein the camera is disposed in the first portion and configured to capture images of objects in a field of view of the person when wearing the housing over the ear.

20. The system of claim 18, further comprising:
a flexible earpiece extending downward from the housing and positioned to fit under a lobe of the ear when worn by the person; and
a third dry EEG sensor disposed in the flexible earpiece.

21. The system of claim 18, further comprising a position sensor or an orientation sensor disposed in the housing.

22. A method comprising, by a processor of an electronic device:
receiving images from a camera of the electronic device, the electronic device comprising EEG sensors and an inertial measurement unit (IMU);
processing the images to identify features corresponding to a known device;
receiving brain-wave signals from at least two of the EEG sensors and comparing the brain-wave signals to each other to measure a level of brain activity;
in response to determining that the known device is an electronic user interface, using the IMU to select a location on the electronic user interface at which an actuation will occur;
upon detection of both (a) a feature corresponding to the known device and (b) the level of brain activity deviating from a baseline by at least a threshold level, generating a command signal configured to cause the known device to actuate; and
transmitting the command signal to the known device or a controller for the known device.

23. The method of claim 22, further comprising, in response to determining that the known device comprises an adjustable setpoint, using the IMU to adjust the setpoint.

24. The method of claim 5, wherein the feature comprises a symbol or pattern of symbols imprinted on a surface of the known device.

25. A system comprising:
a wearable over-the-ear electronic device comprising a set of dry electroencephalography (EEG) sensors, a camera, a processor, an inertial measurement unit (IMU), and programming instructions that are configured to cause the processor to:
receive images from the camera;
process the images to identify features corresponding to a known device;
receive brain-wave signals from at least two of the EEG sensors and compare the brain-wave signals to each other to measure a level of brain activity;
in response to determining that the known device is an electronic user interface, use the IMU to select a location on the electronic user interface at which an actuation will occur;
upon detection of both (a) a feature corresponding to the known device and (b) the level of brain activity deviating from a baseline by at least a threshold level, generate a command signal configured to cause the known device to actuate; and
transmit the command signal to the known device or a controller for the known device.

26. The system of claim 25, wherein the wearable over-the-ear electronic device comprises:
a housing configured to fit over an ear of a person, the housing comprising:
a bridge over the ear,
a first portion extending forward from the bridge to a position over a temple of the person, and
a second portion extending rearward from the bridge;
a first dry electroencephalography (EEG) sensor disposed in the second portion;
a second dry EEG sensor disposed in the first portion;
a power supply; and
a transmitter in communication with the processor.

27. The system of claim 26, wherein the programming instructions are further configured to cause the processor to, in response to determining that the known device comprises an adjustable setpoint, use the IMU to adjust the setpoint.

* * * * *